United States Patent [19]

Pasternak

[11] Patent Number: 5,146,038
[45] Date of Patent: Sep. 8, 1992

[54] PROCESS FOR TREATING A MIXTURE CONTAINING DEWAXED OIL AND DEWAXING SOLVENT

[75] Inventor: Mordechai Pasternak, Spring Valley, N.Y.

[73] Assignee: Texaco Inc., White Plains, N.Y.

[21] Appl. No.: 553,512

[22] Filed: Jul. 16, 1990

[51] Int. Cl.$^5$ .............................................. C07C 7/144
[52] U.S. Cl. ................................... 585/818; 208/308; 210/651; 210/654; 210/500.37
[58] Field of Search ................ 585/818, 819; 208/308; 210/651, 654, 500.37

[56] References Cited

U.S. PATENT DOCUMENTS

| 4,532,041 | 7/1985 | Shuey et al. | 585/818 X |
| 4,861,628 | 8/1989 | Schucker | 585/819 X |

Primary Examiner—Theodore Morris
Assistant Examiner—William C. Diemler
Attorney, Agent, or Firm—Robert A. Kulason; James J. O'Loughlin; Carl G. Seutter

[57] ABSTRACT

Charge containing dewaxed oil and dewaxing solvent (typically methyl ethyl ketone and toluene) is treated to separate dewaxing solvent by use of a separating membrane barrier of a polyurea.

12 Claims, No Drawings

PROCESS FOR TREATING A MIXTURE CONTAINING DEWAXED OIL AND DEWAXING SOLVENT

FIELD OF THE INVENTION

This invention relates to a process for treating a charge containing dewaxing solvent and dewaxed oil. More particularly it relates to use of membrane technology to separate dewaxing solvent from dewaxed oil.

BACKGROUND OF THE INVENTION

As is well known to those skilled in the art, hydrocarbon stocks used for the preparation of lubricating oil contain undesirable components which are removed during processing to permit attainment of a product which is characterized by desired properties. Typically a charge stock is subjected inter alia to a dewaxing operation which decreases the wax content and desirably lowers the pour point and the cloud point of the lubricating oil stock.

Dewaxing may be effected by mixing a dewaxing solvent, such as methyl ethyl ketone or methyl isobutyl ketone, optionally in the presence of a hydrocarbon such as toluene or xylene, with the charge oil and cooling the mixture below the desired pour point, typically to minus 5° F.-minus 20° F., say minus 10° F., at which point wax precipitates. The wax is filtered; and the dewaxed oil—dewaxing solvent mixture is recovered.

This recovered mixture has classically been flashed to recover solvent-free lubricating oil stock and solvent which is free of lubricating oil.

Those skilled in the art have attempted to improve the economics of this process by utilizing membrane technology to separate dewaxing solvent from dewaxed oil. Illustrative of such prior art attempts may be the following:

U.S. Pat. No. 4,678,555 to Wernick discloses use of cellulose acetate membranes.

European Patent Application 0 125 907 A1 to Wight discloses use of a polyimide membrane containing —CO—NO— linkages.

European Patent Application 0 220 753 A1 to Bitter et al discloses use of a halogen-substituted silicone membrane.

U.S. Pat. No. 4,617,126 to Funk et al discloses use of a polysulfone membrane.

Additional background may be obtained from the references set forth in these patents.

It is an object of this invention to provide a process for treating a charge containing dewaxing solvent and dewaxed oil. Other objects will be apparent to those skilled in the art.

STATEMENT OF THE INVENTION

In accordance with certain of its aspects, this invention is directed to the process for treating a charge containing dewaxing solvent and dewaxed oil which comprises passing said charge containing dewaxing solvent and dewaxed oil into contact with, as separating membrane barrier, a non-porous separating polyurea layer;

maintaining a pressure drop across said membrane thereby forming a high pressure retentate containing increased content of dewaxed oil and decreased content of dewaxing solvent and a low pressure permeate containing increased content of dewaxing solvent and decreased content of dewaxed oil;

maintaining the pressure on the low pressure discharge side of said membrane above the vapor pressure of said permeate thereby maintaining said permeate in liquid phase;

maintaining the pressure on the high pressure retentate side of said membrane above the vapor pressure of said charge containing dewaxing solvent and dewaxed oil and sufficient to drive permeate across said membrane thereby maintaining said charge dewaxing solvent and dewaxed oil and said retentate in liquid phase;

recovering said permeate containing increased content of dewaxing solvent and decreased content of dewaxed oil; and recovering said retentate containing increased content of dewaxed oil and decreased content of dewaxing solvent.

DESCRIPTION OF THE INVENTION

The lube oil stocks which may be treated by dewaxing may include distillate stocks, deasphalted oils, raffinates from solvent extraction of distillate, hydrotreated oils, hydrocracked distillates, etc. ranging in viscosity at 100° F. from about 30 SUS to 4,000 SUS. Typically such a charge may be characterized by the following:

TABLE

| Property | Range | Preferred | Typical |
|---|---|---|---|
| ibp °F. | 590–900 | 600–800 | 675 |
| 50% bp °F. | 725–1100 | 800–900 | 850 |
| 90% bp °F. | 800–950 | 850–950 | 920 |
| Viscosity | | | |
| SUS/100° F. | 35–3500 | 40–100 | 54.63 |
| 60° F. | 50–10,000 | 100–400 | 348.7 |
| API Gravity | 20–30 | 22–29 | 25.8 |
| Sp. Gr 15° C./15° C. | 0.870–0.895 | 0.880–0.890 | 0.890 |
| Pour Point °F. | 90–125 | 95–110 | 95+ |
| Flash Point °F. | 360–600 | 385–560 | 460 |
| Refractive Index @ 70° C. | 1.4720–1.4940 | 1.4755–1.4920 | 1.4840 |

This waxy oil charge (100 volumes) is mixed with 100–1,000 volumes preferably 200–500 volumes, say 300 volumes (depending on the viscosity grade and wax content of the feedstock) of ketone dewaxing solvent—such as acetone or preferably methyl ethyl ketone or methyl isobutyl ketone optionally diluted with a hydrocarbon solvent to produce dewaxing solvent. In a preferred embodiment, there may be added to 100 volumes of waxy oil charge, dewaxing solvent containing 50–75 volumes of ketone such as methyl ethyl ketone plus 50–25 volumes of a hydrocarbon solvent such as toluene or xylene. The mixture is cooled to minus 5° F.-minus 20° F., say minus 10° F. during which cooling, solid wax precipitates from the waxy oil charge. Typically a mid-continent distillate may be cooled to minus 10° F. to obtain a 0° F. pour point 100 neutral oil. Wax is filtered in a rotary vacuum filter to yield a dewaxed oil filtrate.

In accordance with practice of the process of this invention, this filtrate, containing dewaxing solvent and dewaxed oil, is passed into contact with, as a separation membrane, a non-porous separating polyurea membrane layer.

THE MEMBRANE ASSEMBLY

Practice of the process of this invention may be carried out by use of a composite structure which in one preferred embodiment may include (i) a carrier layer which provides mechanical strength, (ii) a porous support layer, and (iii) a separating layer across which separation occurs.

The composite structure of this invention includes a multi-layer assembly which in the preferred embodiment preferably includes a porous carrier layer which provides mechanical strength and support to the assembly.

THE CARRIER LAYER

This carrier layer, when used, is characterized by its high degree of porosity and mechanical strength. It may be fibrous or non-fibrous, woven or non-woven. In the preferred embodiment, the carrier layer may be a porous, flexible, woven fibrous polyester. A typical polyester carrier layer may be formulated of non-woven, thermally-bonded strands.

THE POROUS SUPPORT LAYER

The porous support layer (typically an ultrafiltration membrane) which may be used in practice of this invention is preferably formed of polyacrylonitrile polymer. Typically the polyacrylonitrile may be of thickness of 40–80 microns, say 50 microns and is preferably characterized by a pore size of less than about 500 Å and typically about 200 Å. This corresponds to a molecular weight cut-off of less than about 80,000, typically 40,000.

THE SEPARATING LAYER

The separating layer which permits attainment of separation in accordance with the process of this invention includes a non-porous film or membrane of 0.2–1.0 microns, say about 0.5 microns of a polyurea polymer.

The polyurea separating membrane may be prepared in situ by the reaction of a polyisocyanate (i.e. a molecule containing at least two isocyanate groups) and a polyamine (i.e. a molecule containing at least two amine groups). Typical polyisocyanates may include e.g. triisocyanates or more preferably diisocyanates typified by the following, the first listed being preferred:

TABLE

| tolylene-2,4- | diisocyanate | TDI |
| meta-phenylene | diisocyanate | mPDI |
| hexamethylene | diisocyanate | HDI |

Typically polyamines which may be employed may include aliphatic, aromatic, or alicyclic polyamines (containing at least two amine groups) such as the following, the first listed being preferred:

TABLE

| Piperazine | PIP |
| meta-phenylene diamine | mPDA |
| para-phenylene diamine | pPDA |

Another category of polyamines may include poly(oxyalkylene) polyamines such as the following:

(i) The Jeffamine ED-600 brand of poly(oxyethylene) diamine of $\overline{M}_n$ of 900;

(ii) The Jeffamine D-400 brand of poly(oxyethylene) diamine of $\overline{M}_n$ of 400;

Formation of the polymer membranes useful as the separating membranes of this invention may be most conveniently effected by interfacial polymerization on top of the support which is preferably poly(acrylonitrile) having a molecular weight cut-off of typically 10,000–40,000. The support may typically be coated with a 0.1 w %–0.5%, say 0.5 w % solution of the amine, (preferably a diamine) typically piperazine, at ambient temperature of 20° C.–80° C., say 25° C. for 4–6 minutes, say 8 minutes. The solution is then drained from the support which is then coated with a 0.04 w %–0.4 w %, say 0.2 w % solution of polyisocyanate, typically the commercial mixture of tolylene diisocyanate (0.04 w %–0.4 w %, say 0.2 w % solution in hydrocarbon such as hexane) at ambient temperature of 20° C.–80° C., say 25° C. for 15–60 seconds, say 30 seconds. As interfacial polymerization occurs, the e.g. piperazine and the e.g. tolylene diisocyanate react to form the polyurea.

The polyurea film so formed is cured at 110° C.–150° C., say 125° C. for 10–20 minutes, say 15 minutes.

Product membrane typically has a barrier layer of 0.1–1 microns, say 0.5 microns.

THE COMPOSITE MEMBRANE

It is a feature of this invention that it may utilize a composite membrane which comprises (i) a carrier layer characterized by mechanical strength, for supporting a porous support layer and a separating layer (ii) a porous support layer such as a polyacrylonitrile membrane of 10–80 microns, and of molecular weight cut-off of 25,000–100,000, and (iii) as a non-porous separating layer a polyurea membrane.

It is possible to utilize a spiral wound module which includes a non-porous separating layer membrane mounted on a porous support layer and a carrier layer, the assembly being typically folded and bonded or sealed along all the edges but an open edge—to form a bag-like unit which preferably has the separating layer on the outside. A cloth spacer, serving as the permeate or discharge channel is placed within the bag-like unit. The discharge channel projects from the open end of the unit.

There then placed on one face of the bag-like unit, adjacent to the separating layer, and coterminous therewith, a feed channel sheet—typically formed of a plastic net.

The so-formed assembly is wrapped around a preferably cylindrical conduit which bears a plurality of perforations in the wall—preferably in a linear array which is as long as the width of the bag-like unit. the projecting portion of the discharge channel of the bag-like unit is placed over the perforations of the conduit; and the bag-like unit is wrapped around the conduit to form a spiral wound configuration. It will be apparent that, although only one feed channel is present, the single feed channel in the wound assembly will be adjacent to two faces of the membrane layer. The spiral wound configuration may be formed by wrapping the assembly around the conduit a plurality of times to form a readily handleable unit. The unit is fitted within a shell (in manner comparable to a shell-and-tube heat exchanger) provided with an inlet at one end and an outlet at the other. A baffle-like seal between the inner surface of the shell and the outer surface of the spiral-wound unit prevents fluid from bypassing the operative membrane system and insures that fluid enters the system principally at one end. The charge passes from the feed channel, into contact with the separating layer and thence therethrough, into the permeate channel and thence therealong to and through the perforations in the conduit through which it is withdrawn as net permeate.

In use of the spiral wound membrane, charge liquid is permitted to pass through the plastic net which serves as a feed channel and thence into contact with the non-porous separating membranes. The liquid which does not pass through the membranes is withdrawn as retentate. The liquid which permeates the membrane passes into the volume occupied by the permeate spacer and through this permeate channel to the perforations in the cylindrical conduit through which it is withdrawn from the system.

In another embodiment, it is possible to utilize the system of this invention as a tubular or hollow fibre. In this embodiment, the polyacrylonitrile porous support layer may be extruded as a fine tube with a wall thickness of typically 0.001–0.1 mm. The extruded tubes are passed first through a bath of one reactant e.g. the polyisocyanate and then through a bath of the other reactant—and cured in situ. A bundle of these tubes is secured (with an epoxy adhesive) at each end in a header; and the fibres are cut so that they are flush with the ends of the header. This tube bundle is mounted within a shell in a typical shell-and-tube assembly.

In operation, the charge liquid is admitted to the tube side and passes through the inside of the tubes and exits as retentate. During passage through the tubes, permeate passes through the non-porous separating layer and permeate is collected in the shell side.

PRESSURE DRIVEN PROCESS

It is a feature of the non-porous separating layer that it is found to be particularly effective when used in a pressure driven process. In a pressure driven process, a charge liquid containing a more permeable and a less permeable component is maintained in contact with a non-porous separating layer; and a pressure drop is maintained across that layer. A portion of the charge liquid dissolves into the membrane and diffuses therethrough. The permeate passes through the membrane and exits as a liquid.

In practice of the process of this invention, the charge containing dewaxing solvent and dewaxed oil in liquid phase typically at 20° C.–40° C., say 25° C. may be passed into contact with the non-porous separating layer of the membrane of this invention. A pressure drop of about 500–1,000 psi, say 800 psi is commonly maintained across the membrane. The feed or charge side of the membrane is at pressure sufficient to drive permeate across the membrane and commonly about 800 psig; and the permeate or discharge side of the membrane is at about atmospheric pressure. The feed is passed over the surface (ca three inches in diameter in one embodiment) of the membrane at a rate (e.g. of about 1,200 ml/min) which minimizes the possibility of concentration polarization.

The permeate which passes through the membrane includes increased content of dewaxing solvent and decreased content of dewaxed oil; and the retentate includes increased content of dewaxed oil and decreased content of dewaxing solvent.

Typically when the charge to the membrane contains (per 100 parts of oil) 100–1100, preferably 200–600 parts, say 500 parts of dewaxing solvent, the permeate may be found to contain 94.5 w % parts of dewaxing solvent and 5.5 w %

Permeate is recovered in liquid phase.

Separation may typically be carried out at a flux of 1–70, say 30 kilograms per square meter per hour. Typically the units may have a rejection of 50–80% and commonly about 67%.

$$\text{Rejection \%} = \frac{\text{(Feed concentration \%} - \text{Permeate Concentration \%)}}{\text{Feed concentration \%}} \times 100.$$

Practice of the process of this invention will be apparent to those skilled in the art from the following examples wherein, as elsewhere in this specification, all parts are parts by weight unless otherwise stated. An asterisk (*) indicates a control example.

DESCRIPTION OF SPECIFIC EMBODIMENTS

EXAMPLE I

In this example, which represents the best mode of carrying out the process of this invention, the polyurea separating layer is formed on top of the commercially available DUY-L brand of support which includes a polyester carrier layer bearing a porous membrane layer of poly(acrylonitrile) of molecular weight cut-off 40,000.

The non-porous polyurea separating layer is fabricated in situ by depositing a 0.5 w % aqueous solution of piperazine (PIP) at 25° C. on the porous support layer. After standing for 8 minutes, the remaining liquid is drained off. There is then deposited on the piperazine layer a 0.2 w % solution in n-hexane of 2,4-tolylene diisocyanate (TDI) at 25° C. for 0.5 minutes. The two components react in situ to form the polyurea separating membrane which is then cured at 125° C. for 15 minutes.

This membrane system (three inch diameter circle) is mounted in a standard cell. There is admitted to the cell and to the non-porous polyurea separating membrane layer a 1:5 ratio charge containing 100 parts of dewaxed lubricating oil and 500 parts of dewaxing solvent (50 w % methyl ethyl ketone and 50 w % toluene) at 25° C. This is typical of the compositions leaving an MEK dewaxing unit.

Separation is carried out at a charge (and retentate) pressure of about 800 psig. Permeate pressure is atmospheric. Selectivity is measured and reported as % Rejection. Clearly a higher selectivity is desired, as this means that the retentate desirably contains less dewaxing solvent and the permeate desirably contains more solvent. Flux is measured as kilograms per square meter per hour (kmh).

In this Example I, the Selectivity (% Rejection) is 67% and the Flux is 30.3 kmh.

EXAMPLES II–IV

In this series of Examples, the procedure of Example I is duplicated except:
(i) In Example II, the concentration of TDI is 0.4 w %.
(ii) In Example III–IV, the concentration of PIP is 0.1 w % and the deposition time of the TDI is 0.25 minutes.
(iii) In Examples III–IV, the TDI concentrations are 0.08 w % and 0.04 % respectively.

TABLE

| Example | Selectivity (% rejection) | Flux (kmh) |
|---|---|---|
| I | 67 | 30.3 |
| II | 66 | 22.9 |
| III | 49 | 27.1 |

TABLE-continued

| Example | Selectivity (% rejection) | Flux (kmh) |
| --- | --- | --- |
| IV | 37 | 30.2 |

From the above it is apparent that the process of this invention permits operation at Selectivity as high as 67% and at Flux as high as 30.3 kmh.

EXAMPLES V-VIII

In this series of Examples, the membrane system of Example V is the same as that of Example I supra, the membrane system of Example VI is the same as that of Example II supra, the membrane system of Example VII is the same as that of Example III supra, and the membrane system of Example VIII is the same as that of Example IV.

The charge contains dewaxed lube oil and solvent in weight ratio of 1:3 (rather than 1:5 as in Examples I-IV).

TABLE

| Example | Selectivity (% rejection) | Flux (kmh) |
| --- | --- | --- |
| V | 59 | 27.3 |
| VI | 65 | 25.2 |
| VII | 66 | 23.6 |
| VIII | 57 | 27.6 |

From the above Table, it is apparent that the process of this invention permits attainment of satisfactory results.

EXAMPLES IX-XVIII

In this series of Examples, the procedure of Example I is generally followed but with modifications noted in the following Table.

The porous support layer of Examples XV-XVI is the Diacel DUY-M brand of poly(acrylonitrile) membrane having a molecular weight cut-off of 20,000. The porous support layer of Examples XVII-XVIII is similar except that it has a molecular weight cut-off of 10,000. That of Examples IX-XIV is the 40,000 cut-off membrane of Example I.

Charge contains 100 parts of dewaxed lube oil and 200 parts of solvent (50 w % MEK—50% toluene).

TABLE

| Example | PIP W % | DEP Time (min) | TDI W % | DEP Time (min) | Selectivity % Rejection | Flux kmh |
| --- | --- | --- | --- | --- | --- | --- |
| IX | 0.5 | 8 | 0.5 | 0.25 | 44 | 25.4 |
| X | 0.5 | 8 | 0.4 | 0.5 | 56 | 21.9 |
| XI | 0.5 | 8 | 0.2 | 0.5 | 49 | 28.2 |
| XII | 0.1 | 8 | 0.1 | 0.25 | 47 | 30.8 |
| XIII | 0.1 | 8 | 0.08 | 0.25 | 54 | 24 |
| XIV | 0.1 | 8 | 0.04 | 0.25 | 45 | 28.2 |
| XV | 0.5 | 8 | 0.4 | 0.5 | 56 | 9.1 |
| XVI | 0.1 | 8 | 0.04 | 0.25 | 53 | 11.2 |
| XVII | 0.5 | 8 | 0.4 | 0.5 | 39 | 7.6 |
| XVIII | 0.1 | 8 | 0.04 | 0.25 | 38 | 7.7 |

DEP is deposition time.

EXAMPLES XIX-XXV

In this series of Examples, the procedure of Example I is generally followed. The charge contains a 1:1:1 weight ratio of MEK, toluene, and Squalene (a branched chain hydrocarbon which is believed to be comparable to an average lube oil—and which permits attainment of accurate data).

The membranes are formed by the interfacial polymerization of the following:

| | Aqueous Phase | | Organic Phase | |
| --- | --- | --- | --- | --- |
| Example | Monomer w % | Dep. Time Min | Monomer w % | Dep. Time Min |
| XIX | 0.5% mPDA | 8 | 0.5% TDI | 0.5 |
| XX | 0.5% mPDA | 8 | 0.5% mPDI | 0.5 |
| XXI | 0.5% pPDA | 8 | 0.5% TDI | 1 |
| XXII | 0.5% ED-600 | 8 | 0.5% TDI | 1 |
| XXIII | 0.5% PIP | 8 | 0.5% TDI | 0.5 |
| XIV | 0.1% PIP | 8 | 0.1% TDI | 0.25 |
| XXV | 0.5% PIP | 8 | 0.5% HDI | 0.5 | mPDA - meta-phenylene diamine
pPDA - para-phenylene diamine
ED-600 - Jeffamine ED-600 brand of poly(oxyethylene) diamine of molecular weight of 900.
PIP - piperazine
TDI - 2,4-tolylene diisocyanate
m-PDI - meta-phenylene diisocyanate
HDI - hexamethylene diisocyanate.

The performance is as follows:

TABLE

| Example | Selectivity % Rejection | Flux (kmh) |
| --- | --- | --- |
| XIX | 55 | 17.3 |
| XX | 31 | 20.5 |
| XXI | 48 | 16.6 |
| XXII | 45 | 25 |
| XXIII | 74 | 19 |
| XXIV | 63 | 28.3 |
| XXV | 77 | 15.4 |

Although this invention has been illustrated by reference to specific embodiments, it will be apparent to those skilled in the art that various charges and modifications may be made which clearly fall within the scope of the invention.

What is claimed:

1. The process for treating a charge containing ketone-containing dewaxing solvent and dewaxed oil which comprises passing said charge containing dewaxing solvent and dewaxed oil into contact with, as separating membrane barrier, a non-porous separating polyurea layer;

maintaining a pressure drop across said membrane thereby forming a high pressure retentate containing increased content of dewaxed oil and decreased content of dewaxing solvent and a low pressure permeate containing increased content of dewaxing solvent and decreased content of dewaxed oil;

maintaining the pressure on the low pressure discharge side of said membrane above the vapor pressure of said permeate thereby maintaining said permeate in liquid phase;

maintaining the pressure on the high pressure retentate side of said membrane above the vapor pressure of said charge containing dewaxing solvent and dewaxed oil and sufficient to drive permeate across said membrane thereby maintaining said charge dewaxing solvent and dewaxed oil and said retentate in liquid phase;

recovering said permeate containing increased content of dewaxing solvent and decreased content of dewaxed oil; and recovering said retentate containing increased content of dewaxed oil and decreased content of dewaxing solvent.

2. The process claimed in claim 1 wherein said polyurea layer is formed by reaction of a polyamine and a polyisocyanate.

3. The process claimed in claim 2 wherein said reaction is interfacial polymerization.

4. The process claimed in claim 2 wherein said polyamine is a diamine.

5. The process claimed in claim 2 wherein said polyamine is piperazine.

6. The process claimed in claim 2 wherein said polyisocyanate is a diisocyanate.

7. The process claimed in claim 2 wherein said polyisocyanate is a tolylene diisocyanate.

8. The process claimed in claim 1 wherein said charge contains a hydrocarbon lubricating oil stock.

9. The process claimed in claim 1 wherein said charge contains methyl ethyl ketone.

10. The process claimed in claim 1 wherein said charge contains methyl isobutyl ketone.

11. The process claimed in claim 1 wherein said charge contains (i) a ketone and (ii) benzene, toluene, or xylene.

12. The process for treating a charge containing methyl ethyl ketone and toluene as dewaxing solvent and a dewaxed hydrocarbon lubricating oil stock which comprises passing said charge containing dewaxing solvent and a dewaxed hydrocarbon lubricating oil stock into contact with, as separating membrane barrier, a non-porous separating polyurea layer formed by interfacial polymerization of piperazine and a tolylene di-isocyanate;

maintaining a pressure drop across said membrane thereby forming a high pressure retentate containing increased content of dewaxed oil and decreased content of dewaxing solvent and a low pressure permeate containing increased content of dewaxing solvent and decreased content of dewaxed oil;

maintaining the pressure on the low pressure discharge side of said membrane above the vapor pressure of said permeate thereby maintaining said permeate in liquid phase;

maintaining the pressure on the high pressure retentate side of said membrane above the vapor pressure of said charge containing dewaxing solvent and dewaxed oil and sufficient to drive permeate across said membrane thereby maintaining said charge dewaxing solvent and dewaxed oil and said retentate in liquid phase;

recovering said permeate containing increased content of dewaxing solvent and decreased content of dewaxed oil; and recovering said retentate containing increased content of dewaxed oil and decreased content of dewaxing solvent.

* * * * *